US006435016B1

(12) United States Patent
Smith, Jr. et al.

(10) Patent No.: US 6,435,016 B1
(45) Date of Patent: Aug. 20, 2002

(54) HEAD GIMBAL ASSEMBLY, TEST DEVICE AND SLIDER FOR USE THEREWITH

(75) Inventors: Stanley C. Smith, Jr., Colorado Springs, CO (US); Oh-Hun Kwon, Westborough, MA (US); John Clayton; Donald A. Bennett, both of Colorado Springs, CO (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 0 days.

(21) Appl. No.: 09/535,505

(22) Filed: Mar. 24, 2000

(51) Int. Cl.[7] .................................................. G01B 5/28
(52) U.S. Cl. ........................................................ 73/105
(58) Field of Search ............................................ 73/105

(56) References Cited

U.S. PATENT DOCUMENTS

| 4,330,910 A | | 5/1982 | Schachl et al. | |
|---|---|---|---|---|
| 4,734,802 A | * | 3/1988 | Higuchi et al. | 360/103 |
| 4,796,127 A | * | 1/1989 | Wada et al. | 360/103 |
| 4,835,640 A | * | 5/1989 | Endo et al. | 360/103 |
| 4,845,816 A | | 7/1989 | Nanis | |
| 5,029,029 A | * | 7/1991 | Hatchett et al. | 360/106 |
| 5,086,360 A | * | 2/1992 | Smith et al. | 360/103 |
| 5,689,064 A | | 11/1997 | Kennedy et al. | 73/105 |
| 5,820,960 A | | 10/1998 | Kwon | |
| 5,824,386 A | | 10/1998 | Laconto, Sr. et al. | |
| 5,864,054 A | | 1/1999 | Smith, Jr. | 73/105 |
| 5,916,655 A | | 6/1999 | Kwon | |

FOREIGN PATENT DOCUMENTS

JP 60-103515 * 6/1985

* cited by examiner

Primary Examiner—Daniel S. Larkin
(74) Attorney, Agent, or Firm—Timothy J. Martin; Michael R. Henson; Mark H. Weygandt

(57) ABSTRACT

A slider for use during production of a rigid memory disk comprises a rigid body fabricated from a single phase material having a fracture toughness greater than 4 MPam$^{0.5}$. A head gimbal assembly and a test device are also provided. The head gimbal assembly comprises a flexure and a slider secured to the flexure's distal end portion. The test device comprises a support structure, a rotary drive operative to rotate a disk thereon relative to the support structure, a head gimbal assembly, a piezoelectric transducer supported on the slider of the head gimbal assembly for producing an electronic signal in response to asperity detection, signal processing electronics for processing the electronic signal, and electrical Interconnects for establishing communication between the transducer and the signal processing electronics.

43 Claims, 4 Drawing Sheets

HEAD GIMBAL ASSEMBLY, TEST DEVICE AND SLIDER FOR USE THEREWITH

FIELD OF INVENTION

The present invention relates to the production and use of magnetic or magneto-optical memory disks. Broadly speaking, the present invention concerns improved slider constructions, such as burnishing heads or glide heads, which may be employed during the production of such disks. The present invention, however, is also more particularly directed to head gimbal assemblies and tests devices incorporating these improved slider constructions.

BACKGROUND OF THE INVENTION

For years, magnetic disks have been employed in various types of data processing systems. A magnetic disk may be in the form of an auxiliary storage device such as a floppy disk, CD ROM, DVD, or the like, which is used to store and retrieve programs and data, or an arrangement of internal storage devices such as hard disks which are permanently enclosed in a drive compartment.

Generally, the hard disk drive within which rigid, magnetic memory disks are mounted is akin to a conventional record turntable in that there is a mechanism for rotating the disk and for translating a read/write data head across the surface of the disk to allow for access to a selected annular track. The magnetic disks are typically journaled for rotation about a spindle in a spaced relationship to one another. A tracking arm is associated with each disk and the data head is mounted to this tracking arm for accessing the desired information. These data heads are typically referred to as "flying" data heads because they do not contact the surface of the disk during rotation. Rather, a data head hovers above the disk surface on an air bearing that is located between the disk and the head.

One concern during the production of rigid, magnetic memory disks is to ensure that asperities (i.e. protrusions on the surfaces of the disks) and particulate debris are adequately removed. Failure to do s o may cause an anomaly when an asperity is encountered by the data head during high speed revolutions, potentially causing errors in the transfer of information or even damage to the data head during operation. In an effort to reduce the occurrences of asperities, manufacturers commonly burnish the memory surfaces of the disks to remove the asperities. This is typically accomplished through the use of a particular head gimbal assembly known in the art as a burnishing head assembly. In the burnishing process, a burnishing head, sometimes more generally referred to as a slider, is mounted in a similar manner relative to the disk as discussed above. During the burnishing process, the burnishing head operates to polish these surface protrusions.

To further illustrate the burnishing process, reference is made to prior art FIG. 1 where a pair of burnishing head assemblies 10 and 12 are shown in use to remove asperities on opposite surfaces of a rigid magnetic memory disk 20 that is journaled for rotation about a spindle 26. While FIG. 1 only depicts the burnishing apparatus associated with a single rigid memory disk 20, it should be appreciated that a plurality of rigid memory disks may be rotatably journaled about spindle 26, with each of these memory disks having an associated pair of burnishing head assemblies. Each of burnishing head assemblies 10 and 12 includes an associated burnishing head, a flexure and a mounting structure that are adapted for use with a system for burnishing one of the moving surfaces of disk 20. Specifically, upper burnishing head assembly 10 has an associated mounting structure 11 to which is secured a flexure 13 and a slider in the form of a burnishing head 15. Burnishing head assembly 10 is employed to shave asperities and eliminate particulate debris on an upper surface 22 of disk 20. Similarly, lower burnishing head assembly 12 is employed to shave asperities and eliminate particulate debris on a lower surface 24 of disk 20, and lower burnishing head assembly 12 includes an associated mounting structure 14 to which is secured a flexure 16 and a slider in the form of a burnishing head 18.

In the past, alumina titanium carbide (AlTiC) has been the predominant composition by which burnishing heads are fabricated, and many burnishing heads additionally incorporate a diamond-like carbon (DLC) coating. Burnishing heads in the past have also been composed of aluminum oxide ($Al_2O_3$), as discussed in U.S. Pat. No. 4,330,910, issued May 25, 1982 to Schachl et al.

The next step in further refining magnetic disks once the burnishing operation is completed is through the use of a glide head. The purpose of a glide head is to detect, via proximately or contact, any remaining asperities which may come into contact with the data head during use. Glide heads hover and detect asperities which are located above specified data head flying heights. Glide heads, thus, dynamically test the integrity of surfaces of magnetic disk media.

For manufacturers to develop production quality rigid memory disks, it is necessary to utilize glide heads having more sensitive response characteristics. Unfortunately, many glide head assemblies have inherent problems associated with them because it is difficult to precisely control the electrical response characteristics of these devices. U.S. Pat. No. 5,689,064 to Kennedy, et al., issued Nov. 18, 1997, addresses this problem by providing, in part, a glide head assembly which incorporates a piezoelectric transducer disposed between a flexure and a slider in a cantilevered orientation. This problem is also addressed in U.S. Pat. No. 5,864,054 to Smith, Jr., issued Jan. 26, 1999, which discusses a legged piezoelectric transducer projecting from the side wall of a slider.

In any event, a glide head is also required to fly very close to the surface of a disk, at a flying height of less than 1 $\mu$-inch (250 Å), in order to effectively detect the presence of asperities which project above specified data head flying heights. It is, therefore, not uncommon for glide heads also to come into contact with asperities which have not been completely removed during the burnishing process.

Reference is now made to prior art FIG. 2 to illustrate the ability of a glide head assembly to detect the presence of asperities on disk 20 once the burnishing process is completed. A more detailed discussion of this phase in the manufacturing process may be found in either U.S. Pat. No. 5,689,064 or U.S. Pat. No. 5,864,054, the respective disclosures of which are incorporated herein by reference. In prior art FIG. 2, glide head assembly 30 is shown in use detecting the presence asperities on upper surface 22 of rigid magnetic memory disk 20. Although not shown, another glide head assembly could be employed in a similar fashion to detect asperities on the lower surface of disk 20. Glide head assembly 30 communicates detection results, via electrical leads 32 and paddleboard 34 to an appropriate processing system (not shown). Throughout the testing procedure, disk 20 rotates with a varying angular velocity "w" so that upper surface 22 passes beneath glide head assembly 30 with a constant linear velocity. As disk 20 rotates, glide head assembly 30 is moved inwardly in the direction "R" a selected speed so that the entire upper surface area of disk 20 passes therebelow.

The magnetic media industry, in particular, is requiring that magnetic recording disks have increasing recording densities. Commensurate with this is the need for burnishing heads and glide heads to hover at ever decreasing flying heights above a disk's surface to produce flatter, smoother finishes on these rigid, magnetic disks. Currently, it is necessary to achieve a disk flatness between approximately 1.5 μm and 10 μm and a surface roughness (Ra) value that is between 3 and 12 Angstroms in order to keep up with industry demands. However, existing AlTiC sliders, whether burnishing heads or glide heads, are becoming a less viable solution during the production of rigid memory disks due to the relatively weak bond strength between the different materials. For example, AlTiC, which is a two-phase particulate composite material, has a relatively low fracture toughness in the range of 4 MPam$^{0.5}$. This results in a tendency for the alumina and/or titanium carbide to break off during the burnishing process and become embedded in the disk. Not only does this decrease the efficiency of the slider itself, but it also jeopardizes the quality of the memory disk. Moreover, AlTiC has a Vicker's hardness of approximately 20 GPa which means that, while this material may be relatively hard, it is difficult to machine. Due to the two phase nature of the material it is relatively difficult to obtain desired surface finishes during the manufacture of AlTiC sliders which increases production cost.

Accordingly, there remains a need to provide a new and useful slider construction for use with head gimbal assemblies in general, and burnishing head and glide head assemblies in particular, which does not exhibit the drawbacks discussed above that are associated with existing slider compositions. It would also be desirous to provide a head gimbal assembly and a test device which incorporates such an improved slider construction. The present invention is directed to meeting these needs.

SUMMARY OF INVENTION

It is an object of the present invention to provide a new and useful head gimbal assembly that is adapted for use during the production of magnetic memory disks.

Another object of the present invention is to provide a new and useful test device for use during the production of magnetic memory disks.

A further object of the present invention is to provide a new and useful slider as a component part of a head gimbal assembly, which head gimbal assembly may be either a burnishing head assembly, a glide head assembly or the like.

Yet another object of the present invention is to provide a slider which exhibits improved performance characteristics compared to existing slider constructions.

Still a further object of the present invention is to provide such a slider which is easier to machine and less expensive to manufacture.

In furtherance of these objectives, the present invention broadly relates to sliders, such as glide heads, burnishing heads, certifier heads, clock heads, data heads, or the like, which may be utilized in conjunction with rigid memory disks which may be either magnetic or magneto-optic. To this end, it should be appreciated that the particular type of slider would be utilized either in the testing phase of manufacturing recording media or during recording applications pertinent in the magnetic recording head industry. As will be appreciated from the description to follow, the present invention also more particular concerns either a head gimbal assembly or a test device incorporating the improved slider construction.

Broadly then, the present invention provides for a slider adapted for use with a system that includes a mounting structure, a flexure attached thereto, and a rotary drive. The slider comprises a rigid body adapted to be suspended from the flexure to define a mounted state. This body is fabricated from a single phase material and includes an air bearing surface operative to be oriented in facing relationship to a moving surface of the memory disk when in the mounted state. A mounting surface is positioned opposite the air bearing surface and a sidewall extends between these two surfaces. It should be appreciated that the slider may take on a variety of different shape configurations known to those in the art depending on its particular application.

Preferably, the single phase material has one or more desirable properties, such as a grain size less than 1.5 microns, a surface roughness (Ra) value less than 10 Angstroms (Å) (as may be measured by means of an appropriate optical profilometer), a fracture toughness greater than 4 MPam$^{0.5}$ (as may be measured by the Chantikul identation method discussed in the *Journal of the American Ceramics Society*, p. 64(9), 1981, pp.539–44), a Young's modulus less than 300 GPa, and a porosity of less than ½%. Such a porosity can be achieved by hot isostatic pressing or hot pressing. The single phase material is preferably in the form of zirconium oxide ($Z_rO_2$), also known as zirconia. The zirconium oxide may have a fracture toughness of about 7 MPam$^{0.5}$ and a Young's modulus of approximately 215 GPa. It is also preferred that the zirconium oxide has a crystal structure that is substantially tetragonal. The zirconium oxide may be partially stabilized using a selected doping agent in the form of a metal oxide, such as yttrium oxide ($Y_2O_3$), cerium oxide ($CeO_2$), scandium oxide ($Sc_2O_3$), magnesium oxide (MgO), calcium oxide (CaO), other known rare earth oxide stabilizers, or a mixture thereof. Where yttrium oxide is employed as the doping agent, it is preferred to dope the zirconium oxide with 2.5–5 mol % $Y_2O_3$. Zirconias with <2.5 mol % $Y_2O_3$ is tough, but less stable. On the other hand, zirconias with >5 mol % $Y_2O_3$ is stable, but not tough enough. Zirconium oxides having these characteristics are discussed in U.S. Pat. No. 5,820,960 issued Oct. 13, 1998 to Kwon, U.S. Pat. No. 5,824,386 issued Oct. 20, 1998 to Kwon, et al., and U.S. Pat. No. 5,916,655 issued Jun. 29, 1999 to Kwon. The respective disclosures of these patents are incorporated herein by reference. The zirconium oxide can be polished to the surface finish (Ra) of <10 Å, and it is expected that the surface roughness of the air bearing surface will be as low as <2 Å in the future in order to achieve rapidly increasing storage density goals.

The present invention also relates to a head gimbal assembly adapted for use with a system during production of rigid memory disks. Here, the head gimbal assembly comprises a flexure extending along a longitudinal axis, with the flexure including a proximal end portion adapted to be secured to a support structure and a distal end portion adapted to be positioned in proximity to a moving surface of the rigid memory disk. A slider is secured to the distal end portion, with this slider having one or more of the characteristics discussed herein.

Finally, a test device is provided for testing moving surfaces on a rotating disk to determine a presence of asperities thereon. The test device broadly comprises a support structure, a rotary drive, at least one glide head assembly, signal processing electronics and electrical interconnects. The rotary drive is operative to rotate a disk thereon relative to the support structure. The glide head assembly is supported on the support structure and includes a flexure and slider as discussed herein, and a piezoelectric transducer supported on the slider. The piezoelectric transducer is responsive to the presence of an asperity relative to the slider as the asperity moves past the slider to vibrate, thereby to produce an electronic signal. The signal processing electronics are operative to process this electronic signal, and the electrical interconnects establish communication between the transducer and the signal processing electronics.

These and other objects of the present invention will become more readily appreciated and understood from a consideration of the following detailed description of the exemplary embodiments of the present invention when taken together with the accompanying drawings, in which:

DETAILED DESCRIPTION OF THE EXEMPLARY EMBODIMENTS

The present invention broadly relates to a slider which may be employed during the production or use of rigid memory disks which have applications in the magnetic recording head industry. While the present invention is particularly described herein with reference to sliders in the form of either a burnishing head or a glide head, the ordinarily skilled artisan should readily appreciate that other types of sliders are contemplated. These other types of specialty head constructions may include, for example, certifier heads, clock heads, read-write data heads, or the like which are utilized either in the testing phase of manufacturing recording substrates or during recording applications pertinent in the magnetic recording head industry.

Figure 1:
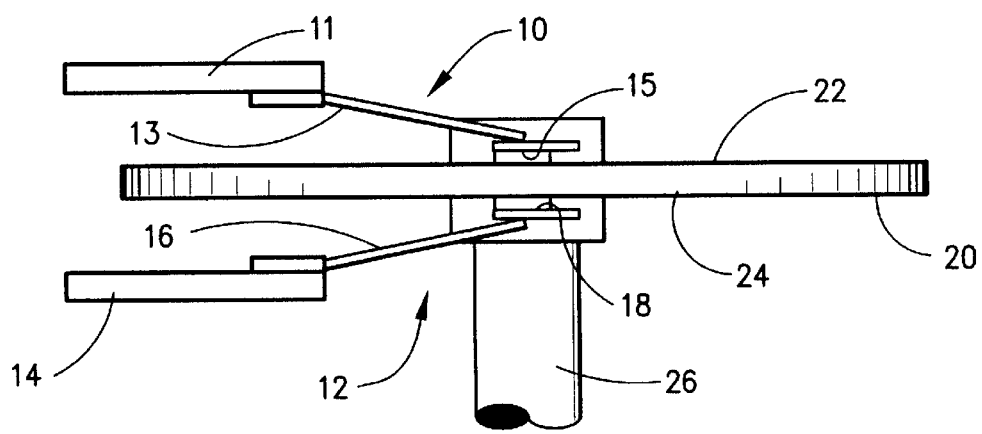
FIG. 1 is a diagrammatic side view showing a pair of prior art head gimbal assemblies, depicted as burnishing head assemblies, in use during the production of a rigid magnetic memory disk to shave asperities therefrom.
Figure 2:
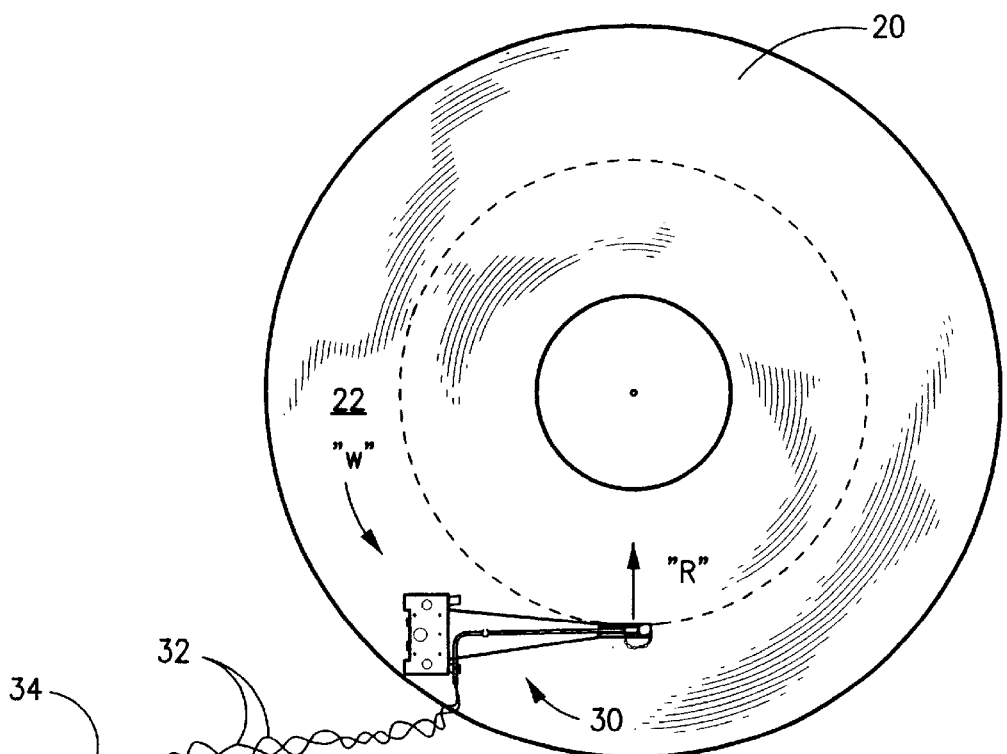
FIG. 2 is top plan view of a test device in the form of a prior art glide head assembly hovering above the surface of a magnetic disk that is rotating counterclockwise at an angular velocity "w"
Figure 3:
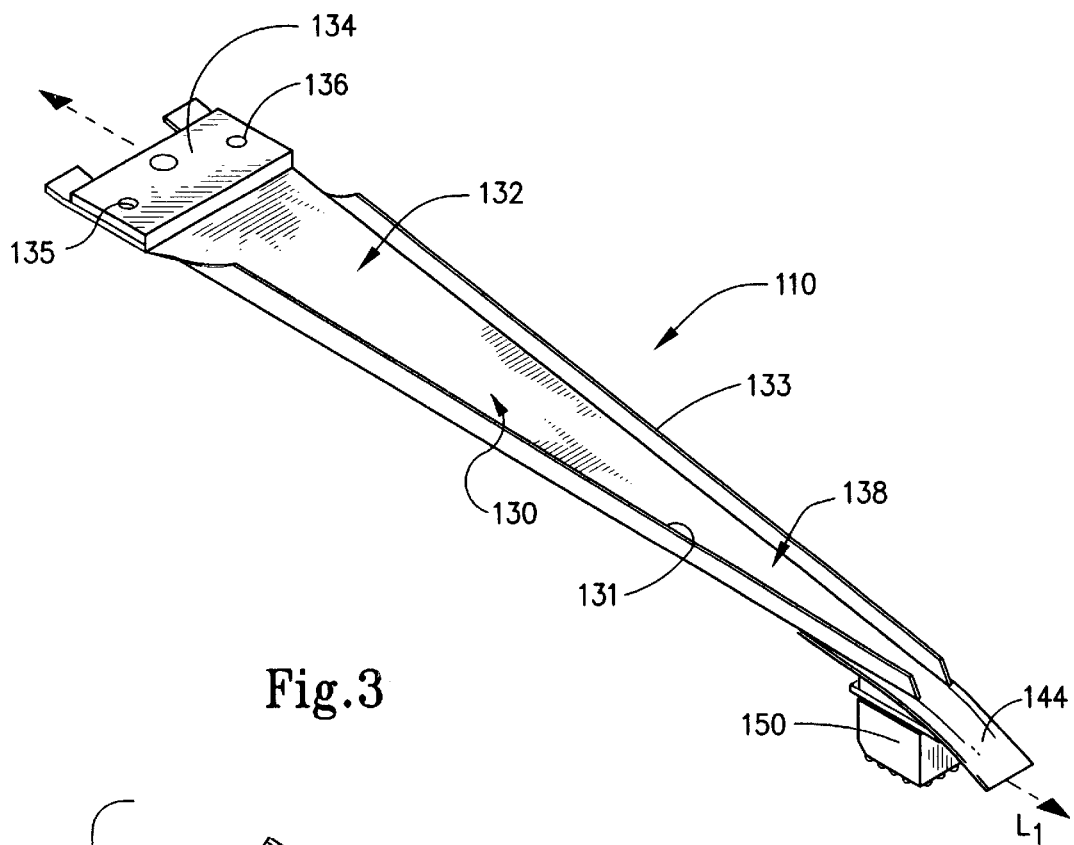
FIG. 3 is a perspective view of a burnishing head assembly constructed according to one embodiment of the present invention.
Figure 4:
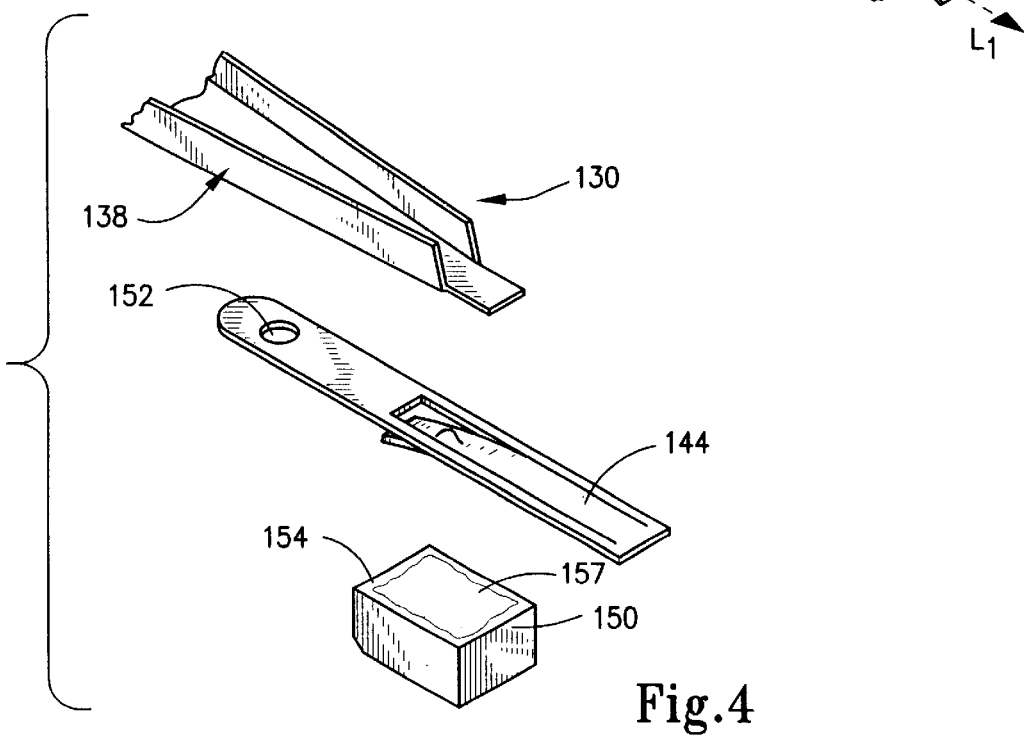
FIG. 4 is an exploded perspective view of the distal end portion of the burnishing head assembly shown in FIG. 3.

One embodiment of the present invention, as shown in FIGS. 3 and 4, is in the form of a burnishing head assembly 110 that is adapted for use during the production of these rigid memory disks to shave asperities therefrom. Representative burnishing assembly 110 comprises an elongated flexure 130 and a burnishing head structure 150. Flexure 130 includes a first end portion 132 which is adapted to be secured to a mounting structure, as discussed in the background of the present invention, by a mounting bracket 134 that is provided with a pair of spaced apart securement holes 135 and 136. A second end portion 138 of flexure 130, which is opposite first end portion 132, and is adapted to be positioned in proximity to the upper moving surface of a rigid memory disk when in an operative state shown in prior art FIG. 1.

Flexure 130 extends along a longitudinal axis "$L_1$" and includes a pair of spaced apart, upstanding sidewalls 131 and 133 which are symmetrical about longitudinal axis "$L_1$," and converge from first end portion 132 toward second end portion 138. Flexure 130 also includes a tongue 144 which forms part of second end portion 138. As better illustrated in FIG. 4, tongue 144 may be registered with flexure 130 by a tooling hole 152 and thereafter secured to flexure 130 by laser welding to facilitate manufacture. With this in mind, flexure 130 is preferably a Type 2 flexure as known in the art, although other types of flexures may also be employed. Slider 150 is in the form of a burnishing head which projects downwardly from tongue 144 and is mounted thereto by an appropriate adhesive 157.

Figure 5:
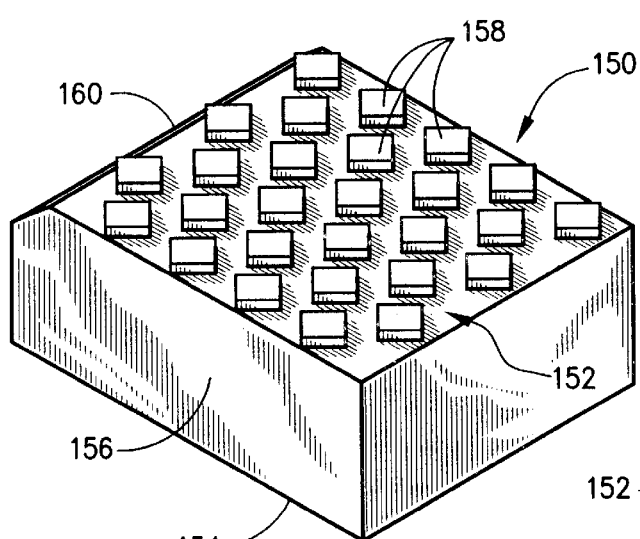
FIG. 5 is a perspective view of the burnishing shown in FIGS. 3 and 4.
Figure 6:
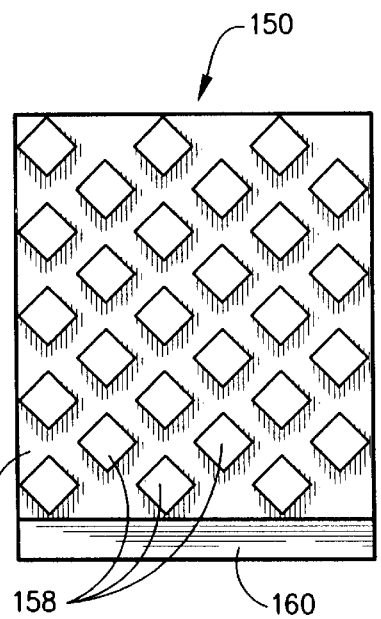
FIG. 6 is a bottom plan view of the burnishing head shown in FIGS. 3–5.

One possible construction for burnishing head 150 may best be appreciated with reference to FIGS. 4–6. Burnishing head 150 is a generally rectangular body having a lower surface 152 an upper surface 154 and a sidewall 156 extending therebetween. Upper surface 154 is provided with an appropriate adhesive 157 in order to mount burnishing head 150 to the tongue 144 of burnishing head assembly 110. While a variety of different types of adhesives may be used for this purpose, an adhesive of choice which exhibits desirable characteristics is a Loctite® 366UV adhesive, a trademark of the Loctite Corporation of Hartford, Conn. Lower surface 152 of burnishing head 150 is formed in part by a plurality of cutting protrusions 158 which may be organized in a regular array as shown in FIGS. 5 and 6. Cutting protrusions 158 are designed to sequentially shave asperitites which are encountered as burnishing head 150 moves across the surface of a rigid memory disk during the fabrication phase. Burnishing head 150 also includes a leading edge ramp 160 which is inclined away from the disk surface when in a mounted state to facilitate the initial confrontation and removal of the upper portions of asperities. It should be appreciated that the configuration of burnishing head 150 as discussed herein is only one possible type of configuration that has been employed in the past, and that other types of configurations are possible.

The difference between the present invention and heretofore known burnishing heads, however, is in the material out of which burnishing head 150 is fabricated. While burnishing heads in the past have been predominantly fabricated from alumina titanium carbide (AlTiC), which is a heterogeneous or multi-phase material, it has been surprisingly found that a homogenous or single-phase material having the characteristics discussed herein is more desirable. In one sense, a single phase material is preferred because it is inherently stronger than multi-phase materials which can have weak bond strength. For example, alumina titanium carbide is approximately 70% aluminum oxide and approximately 30% titanium carbide. The two phase boundary between the aluminum oxide and the titanium carbide is weaker than in a single phase material, which results in a tendency for the alumina and/or titanium carbide to break off and get imbedded into a disk during production as a result of the brittle bond strength.

It has been surprisingly found that constructing burnishing head 150 of a single phase material, such as zirconium oxide ($ZrO_2$), reduces this occurrence due in part to the high fracture toughness of the material. For example, zirconium oxide has a fracture toughness in the range of 7 MPam$^{0.5}$, as compared to alumina titanium carbide which has a fracture toughness in the range of 4 MPam$^{0.5}$. Because fracture toughness of a material is inversely related to its hardness, zirconium oxide is also a more machinable material compared to alumina titanium carbide. Zirconium oxide is also a less expensive material than AlTiC, which results in a reduction in manufacturing costs. It is preferred to partially stabilize the zirconium oxide using a selected doping agent that is in the form of a metal oxide, such as yttrium oxide ($Y_2O_3$), cerium oxide ($CeO_2$), scandium oxide ($Sc_2O_3$), magnesium oxide (MgO), calcium oxide (CaO), etc., or a mixture thereof. Where yttrium oxide ($Y_2O_3$) is the doping agent, it is preferred to stabilize so that the zirconium oxide is arranged in a substantially tetragonal crystal structure. It is also preferred to apply high pressure and temperature to the zirconium oxide by hot isostatic pressing (HIP) or hot pressing to make the material fully dense and yield a low porosity. To this end, the preferred zirconium oxide material is identified as YZ110 HS or YZ130HS, each a yttria-stabilized zirconia (Y-TZP) available from Saint-Gobain Industrial Ceramics, Inc. of Export Pennsylvania. A variety of different forming techniques can be employed to manufacture burnishing head 150 out of zirconium oxide, such as ion milling, reactive ion etching or micro-laser machining with a hard coating such as diamond-like carbon (DLC) coating.

While zirconium oxide is the preferred material out of which burnishing head 150 is constructed, the present invention should not be unnecessarily confined as such. That is, the present invention broadly contemplates a slider body fabricated from a single phase material having one or more desirable characteristics, such as a grain size less than 1.5 microns, a porosity of less than one-half percent, a surface roughness (Ra) value less than 10 Angstroms, a fracture toughness greater than 4 MPam$^{0.5}$, and a Young's modulus of less than 300 GPa.

Figure 7:
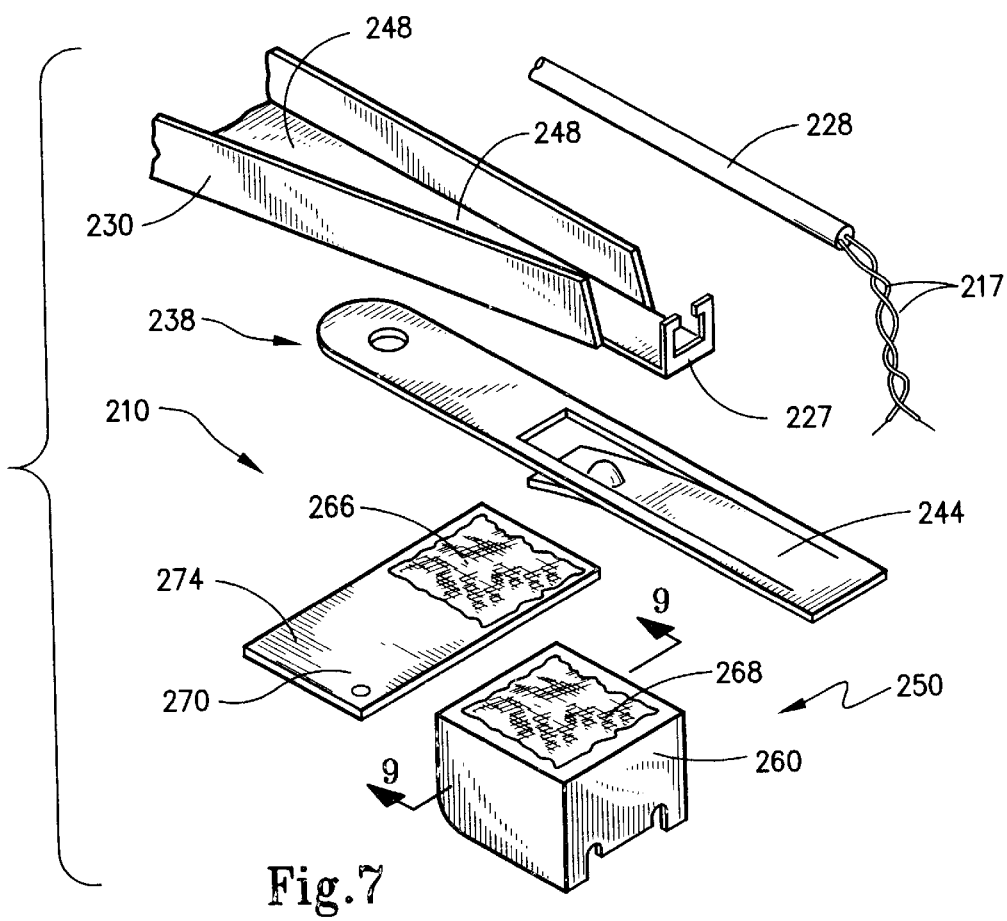
FIG. 7 is an exploded perspective view of the distal end portion of a glide head assembly according to another embodiment of the present invention.
Figure 8:
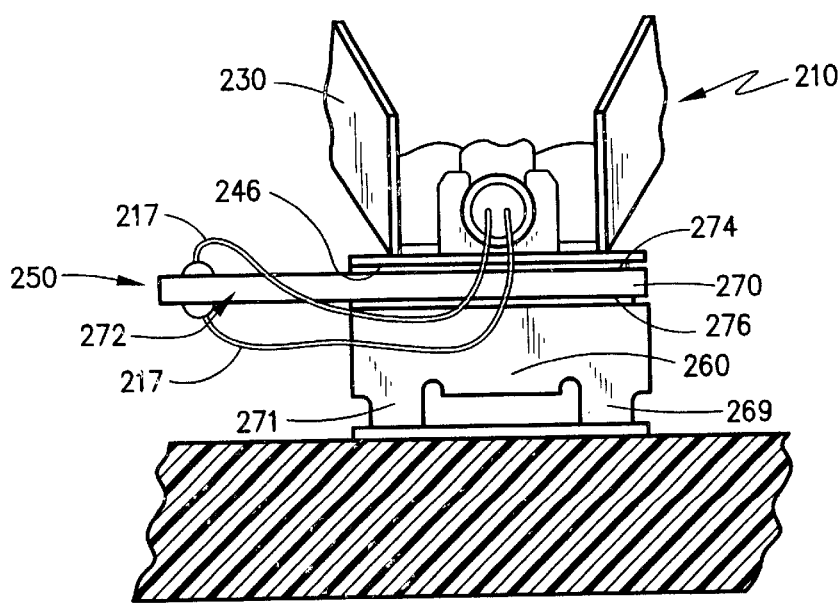
FIG. 8 is a distal end view in elevation, and in partial cross-section, of the glide head assembly, and showing the glide head assembly hovering above the surface of a rotating magnetic memory disk.

Another embodiment of the present invention is shown in FIGS. 7 and 8. This embodiment is also a head gimbal assembly, but shown here to be in the form of a glide head assembly 210. Glide head assembly 210 comprises a flexure 230 and a glide head structure 250. Flexure 230, is constructed similarly to flexure 130 discussed above, and includes a proximal end portion (not shown) which is adapted to be mounted to an appropriate support structure, and a distal end portion 238. Flexure 230 also includes a tongue 244 which is mounted thereto and forms part of distal end portion 238.

Glide head structure 250 of glide head assembly 210 broadly includes a slider in the form of a glide head 260 that projects downwardly from a lower surface 246 of flexure 230 and a piezoelectric transducer 270. As known in the art, a variety of different types of glide head structures can be employed to achieve desirable response characteristics. In the embodiment shown in FIGS. 7 and 8, piezoelectric transducer 270 is configured as a flat plate that is partly sandwiched between slider 260 and tongue 244 so that it has an exposed free end portion 272 which projects outwardly from a region between distal end portion 238 and slider 260 to define a cantilever. This type of construction is more particularly discussed in U.S. Pat. No. 5,689,064 to Kennedy, et al. Alternatively, the piezoelectric transducer which forms a component part of the glide head structure may be a legged member that is disposed on a sidewall of the slider, as discussed in U.S. Pat. No. 5,864,054 to Smith, Jr.

A pair of electrical leads 217 are respectively connected to the upper and lower surfaces 274 and 276 of piezoelectric transducer 270. Layers of gold conducting material may be provided for these connections. The electrical leads 217 operate to communicate electrical signals to a signal processing unit, as known in the art. A sleeve 228 is disposed longitudinally along an upper surface 248 of flexure 230 and this sleeve 228 receivably supports electrical leads 217. A bracket 227 is also provided on upper surface 248 to receivably retain sleeve 228 so that the integrity of electrical signals produced by glide head assembly 210 is not jeopardized by unnecessary movement of electrical leads 217 during operation.

Piezoelectric transducer 270 is secured to the distal end portion 238 of flexure 230, and specifically the lower surface 246 of tongue 244, by a first layer 266 of first adhesive. It is preferred that this first adhesive layer 266 be selected to electrically insulate flexure 230 from piezoelectric transducer 270. Moreover, it is preferred that this first adhesive layer 266 have a bond that does not distort the slider and has properties to withstand physical and thermal shock. Adhesive 266 may be a Loctite® IMPRUV366, or other appropriate adhesive. A second layer 268 of second adhesive material operates to secure slider 260 to piezoelectric transducer 270. This second adhesive layer 268 may be a Loctite® 352UV curable adhesive, or other appropriate composition.

Figure 10:
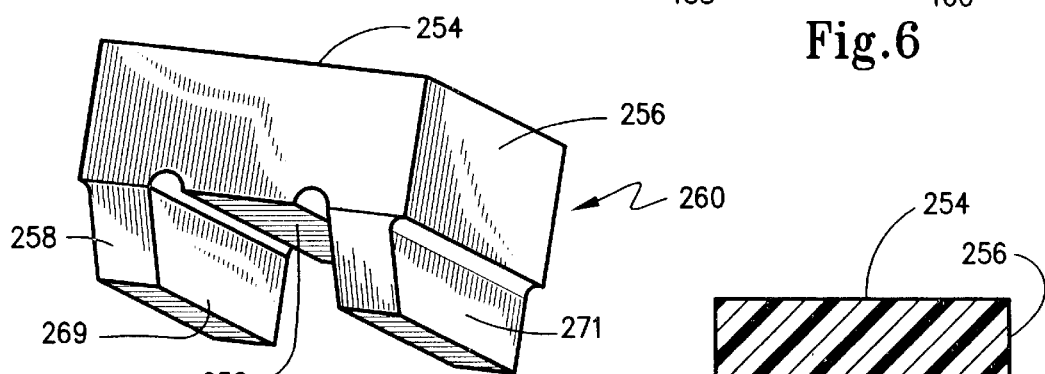
FIG. 10 is a perspective view of the glide head shown in FIGS. 7–9.
Figure 9:
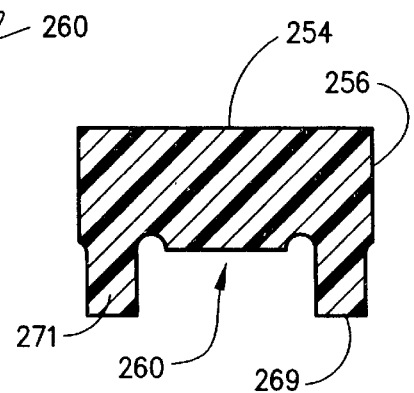
FIG. 9 is a front view in cross-section of the glide head shown in FIGS. 7 and 8, as viewed about lines 9—9 in FIG. 7.
Figure 11:
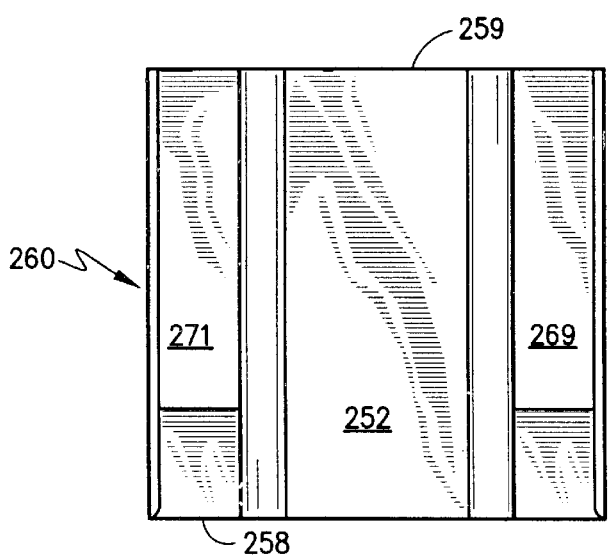
FIG. 11 is a bottom plan view of the glide head shown in FIGS. 7–10.

A preferred configuration for slider 260 may now be appreciated with reference to FIGS. 9–11, although it should again be appreciated that the particular shape configuration should not be unnecessarily confined to that discussed herein. Slider 260 is also broadly in the form of a rigid body and includes an air bearing surface 252, an opposite mounting surface 254 and a surrounding sidewall 256 extending therebetween. A leading edge portion 258 of slider 260 is ramped to provide stability to slider 260 so that glide head structure 250 may fly with a certain pitch, thereby preventing glide head structure 250, and specifically slider 260, from flying too close to the upper surface of a rigid memory disk.

Slider 260 also includes a trailing edge 259 which hovers closer to the upper surface of a rigid memory disk during operation, as is known in the art. As is also known in the art, glide head 260 may be provided with a pair of spaced apart rails 269 and 271 which help to define it's air bearing surface 252. Finally, it is preferred that glide head 260 also be fabricated from an appropriate single phase material, such as zirconium oxide, so that it exhibits any one or more of the desirable characteristics discussed hereinabove with reference to burnishing head 150. It is believed that such a construction for glide head 260 also distinguishes over known glide head constructions.

To manufacture zirconium oxide sliders according to the present invention, slicing is performed on a wafer of the substrate material, such as either the YZ110HS or the YZ130HS discussed above, to divide it into individual production blocks. To fabricate burnishing heads specifically, an initial step of cutting grooves into the wafer material may be performed to generally define the air bearing surface, such as the diamond pattern air bearing surface shown in the FIGS. 5 and 6. A plurality of the production blocks are then mounted onto a transfer tool and a flat grind process is performed on the air bearing surfaces to remove any inconsistencies. The sliders are then polished to attain a desirable surface roughness range. The polishing steps are permutations of those discussed in U.S. Pat. No. 5,824,386 to Kwon, et al, issued Oct. 20, 1998, which relates to polishing YTZP zirconia disk substrates.

Initially, a rough lap step is performed to shave about 1 mil off the sliders. The transfer tools are mounted to lapping pucks in sets of three bars per puck using stainless socket screws. More specifically, the transfer tooling bars are mounted perpendicularly to their respective pucks so that all of the air bearing surfaces of the sliders are in a common plane. The lapping pucks are then placed in conditioning rings so that the sliders are in contact with a lapping plate. The conditioning rings are preferably round ceramic rings having an outer to inner diameter difference of approximately one inch, and are used to create an even slurry distribution on the lapping plate. Preferably, the lapping plate is a Lapmaster® Kemet® copper lapping plate available from Lap Master International of Morton Grove, Ill. The sliders are then lapped under 160 psi at a lapping plate rotational speed of approximately 60 rpm, a puck speed of approximately 105 rpm, and a constant drip of a water-based slurry of 1.6 ml per minute. This slurry is preferably a 60/40 mixture of Engis® 3 micron solution available from the Engis Corporation of Wheeling, Ill. and Warren® Diamond 3 micron solution available from Warren Diamond of Olyphant, Pa. The stock removal time is approximately eight minutes.

After verification of part dimensions, a semi-lap process is performed to shave an additional one-half millimeter. In the semi-lap process, the lapping pucks are placed in conditioning rings with the sliders in contact with another lapping plate, preferably a Lapmaster® Kemet® tin lapping plate, also available from Lap Master International of Morton Grove, Ill. The sliders are then lapped under 80 psi at a lapping plate speed of approximately 60 rpm, a puck speed of approximately 90 rpm, and a constant drip of another water-based slurry of 1.0 ml per minute. Here, the slurry is preferably a 50/50 mixture of Engis® 1 micron solution from the Engis Corporation of Wheeling, Ill. and a Warren® Diamond ½ micron solution available from Warren Diamond of Olyphant, Pa. Stock removal time for the semi-lap process is approximately five minutes.

After part dimension verification and an additional measurement phase utilizing statistical process control dimensioning, colloidal silica polishing is performed. In the colloidal silica polishing step, a moistened pad, such as an IC1000 pad available from Rodell, Inc. of Newark, Del., is mounted on an appropriate lapping plate. The pad is moistened with colloidal silica available from the Nalco Chemical Company of Naperville, Ill. and a deionized water mixture. The pH should be adjusted to about eleven as recommended in U.S. Pat. No. 5,824,386 to Kwon, et al. The sliders are then lapped under 15 psi at a lapping plate speed of approximately 15 rpm, a puck speed of approximately 7 rpm and a constant drip of a colloidal silica/deionized water mixture of 1.0 ml per minute for approximately thirty seconds. Stock removal time is approximately one minute. The sliders are then cleaned with deionized water and an alkaline surfactant, preferably the Chemcrest 2000® available from Crest Ultrasonics Corp. of Trenton, N.J.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

We claim:

1. A slider adapted for use with a system during production of a rigid memory disk, wherein the system includes a mounting structure, a flexure attached to said mounting structure, and a rotary drive operative to rotate the memory disk relative to said mounting structure, said slider comprising a rigid body adapted to be suspended from the flexure in a mounted state, said body fabricated from a single phase material and having a fracture toughness greater than 4 $MPam^{0.5}$ and including an air bearing surface operative to be oriented in facing relationship to a moving surface of the memory disk when in the mounted state, a mounting surface opposite said air bearing surface, and a side wall extending between said air bearing surface and said mounting surface.

2. A slider according to claim 1 wherein said single phase material has a grain size less than 1.5 microns.

3. A slider according to claim 1 wherein said single phase material has a porosity of less than ½%.

4. A slider according to claim 3 wherein said single phase material has a surface roughness value less than 10 Angstroms.

5. A slider according to claim 1 wherein said single phase material has less than 0.5% impurities.

6. A slider according to claim 5 wherein said fracture toughness is 7 $MPam^{0.5}$.

7. A slider according to claim 1 wherein said single phase material is zirconium oxide.

8. A slider according to claim 7 wherein said zirconium oxide is a substantially tetragonal crystal structure.

9. A slider according to claim 7 wherein said zirconium oxide is partially stabilized using a selected doping agent.

10. A slider according to claim 9 wherein said doping agent is a metal oxide.

11. A slider according to claim 10 wherein said doping agent is selected from a group consisting of yttrium oxide ($Y_2O_3$), cerium oxide ($CeO_2$), scandium oxide ($Sc_2O_3$), magnesium oxide (MgO), calcium oxide (CaO), or a mixture thereof.

12. A slider according to claim 11 wherein said doping agent is scandium oxide ($Sc_2O_3$).

13. A slider according to claim 9 wherein said zirconium oxide is doped with 2.5–5 mol % yttrium oxide.

14. A slider according to claim 9 wherein said zirconium oxide is doped with less than 4 mol % yttrium oxide.

15. A slider according to claim 7 wherein said zirconium oxide has a porosity of less than ½%.

16. A slider according to claim 7 wherein said zirconium oxide has less than 0.5% impurities.

17. A slider according to claim 7 wherein said zirconium oxide has a grain size less than 1.5 microns.

18. A slider according to claim 7 wherein said zirconium oxide has a surface roughness (Ra) value less than 10 Angstroms.

19. A head gimbal assembly associated with a mounting structure and adapted for use with a system during production of a rigid memory disk, comprising:

(a) a flexure extending along a longitudinal axis and including a proximal end portion adapted to be secured to said mounting structure and a distal end portion adapted to be positioned in proximity to a moving surface of the memory disk; and (b) a slider secured to said distal end portion, said slider comprising a rigid body fabricated from a single phase material and having a fracture toughness greater than 4 $MPam^{0.5}$.

20. A head gimbal assembly according to claim 19 wherein said single phase material has a grain size less than 1.5 microns.

21. A head gimbal assembly according to claim 19 wherein said single phase material has a porosity of less than ½%.

22. A head gimbal assembly according to claim 19 wherein said single phase material has less than 0.5% impurities.

23. A head gimbal assembly according to claim 19 wherein said single phase material has a surface roughness (Ra) value less than 10 Angstroms.

24. A head gimbal assembly according to claim 19 wherein said fracture toughness is 7 MPam$^{0.5}$.

25. A head gimbal assembly according to claim 19 wherein said single phase material is zirconium oxide.

26. A head gimbal assembly according to claim 25 wherein said zirconium oxide has a porosity of less than ½%, a grain size less than 1.5 microns, and a surface roughness (Ra) value less than 10 Angstroms.

27. A head gimbal assembly according to claim 25 wherein said zirconium oxide is a substantially tetragonal crystal structure.

28. A head gimbal assembly according to claim 25 wherein said zirconium oxide is partially stabilized using a selected doping agent.

29. A head gimbal assembly according to claim 28 wherein said doping agent is a metal oxide.

30. A head gimbal assembly according to claim 28 wherein said doping agent is selected from a group consisting of yttrium oxide ($Y_2O_3$), cerium oxide ($CeO_2$), scandium oxide ($Sc_2O_3$), magnesium oxide (MgO), calcium oxide (CaO), or a mixture thereof.

31. A head gimbal assembly according to claim 30 wherein said zirconium oxide is doped with 2.5–5 mol % yttrium oxide.

32. A head gimbal assembly according to claim 28 wherein said zirconium oxide is doped with less than 4 mol % yttrium oxide.

33. A test device for testing moving surfaces on a rotating disk to determine a presence of asperities thereon, comprising:
(a) a support structure;
(b) a rotary drive operative to rotate a disk thereon relative to said support structure;
(c) at least one glide head assembly supported on said support structure, said glide head assembly including:
(1) a flexure extending along a longitudinal axis and including a proximal end portion secured to said support structure and a distal end portion positioned in proximity to one of said moving surfaces;
(2) a slider secured to said distal end portion, said slider comprising a rigid body fabricated from a single phase material and having a fracture toughness greater than 4 MPam$^{0.5}$; and
(3) a piezoelectric transducer supported on said slider, said piezoelectric transducer responsive to the presence of an asperity relative to said slider as the asperity moves past said slider to vibrate thereby to produce an electronic signal;
(d) signal processing electronics operative to process the electronic signal; and
(e) electrical interconnects establishing electrical communication between said transducer and said signal processing electronics.

34. A test device according to claim 33 wherein said single phase material is zirconium oxide.

35. A test device according to claim 34 wherein said zirconium oxide has a porosity of less than ½%.

36. A test device according to claim 33 wherein said single phase material has a grain size which is less than 1.5 microns.

37. A test device according to claim 36 wherein said single phase material has a porosity of less than ½%.

38. A test device according to claim 33 wherein said single phase material has a surface roughness (Ra) value less than 10 Angstroms.

39. A test device according to claim 33 wherein said single phase material has less than 0.5% impurities.

40. A slider adapted for use with a system during production of a rigid memory disk, wherein the system includes a mounting structure, a flexure attached to said mounting structure, and a rotary drive operative to rotate the memory disk relative to said mounting structure, said slider comprising a rigid body adapted to be suspended from the flexure to in a mounted state, said body fabricated from zirconium oxide to have a substantially tetragonal crystal structure, and including an air bearing surface operative to be oriented in facing relationship to a moving surface of the memory disk when in the mounted state, a mounting surface opposite said air bearing surface, and a side wall extending between said air bearing surface and said mounting surface.

41. A head gimbal assembly associated with a mounting structure and adapted for use with a system during production of a rigid memory disk, comprising:
(a) a flexure extending along a longitudinal axis and including a proximal end portion adapted to be secured to said mounting structure and a distal end portion adapted to be positioned in proximity to a moving surface of the memory disk; and
(b) a slider secured to said distal end portion, said slider comprising a rigid body fabricated from zirconium oxide to have a substantially tetragonal crystal structure.

42. A slider adapted for use with a system during production of a rigid memory disk, wherein the system includes a mounting structure, a flexure attached to said mounting structure, and a rotary drive operative to rotate the memory disk relative to said mounting structure, said slider comprising a rigid body adapted to be suspended from the flexure in a mounted state, said body fabricated from a single phase material that has a Young's modulus less than 300 GPa and a fracture toughness greater than 4 MPam$^{0.5}$, and including an air bearing surface operative to be oriented in facing relationship to a moving surface of the memory disk when in the mounted state, a mounting surface opposite said air bearing surface, and a side wall extending between said air bearing surface and said mounting surface.

43. A slider according to claim 42 wherein said Young's modulus is approximately 215 GPa.

* * * * *